(No Model.)
E. DAWSON.
LOOSE PULLEY LUBRICATOR.
No. 487,257. Patented Dec. 6, 1892.
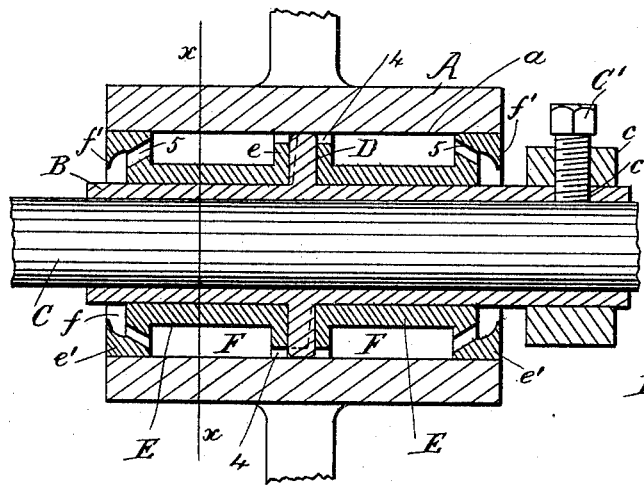
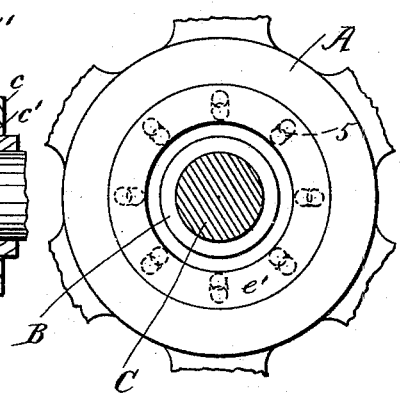
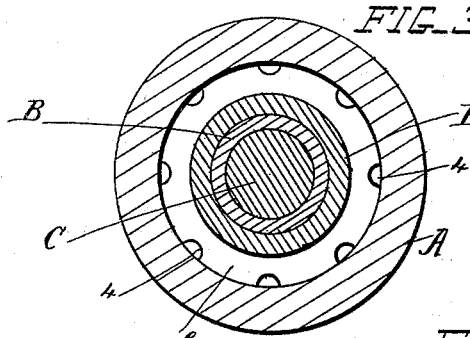
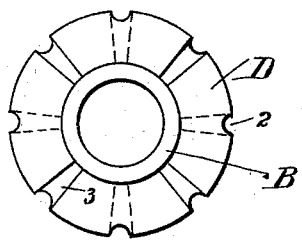
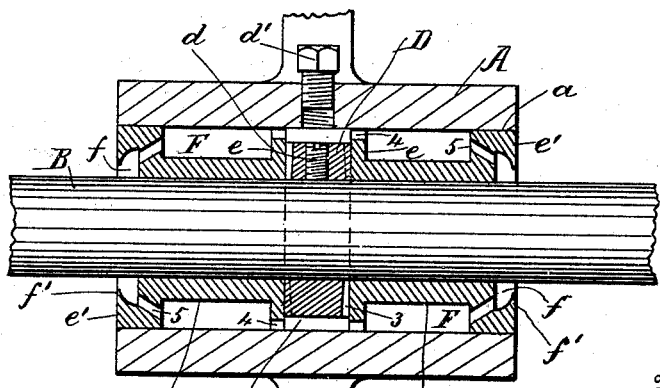
Witnesses
Walter Allen
Relle Pleistt
Inventor
Edward Dawson.
By his Attorney
Herbert W. T. Jenner.

UNITED STATES PATENT OFFICE.

EDWARD DAWSON, OF TERRE HAUTE, INDIANA, ASSIGNOR OF ONE-HALF TO GEORGE BURT, OF SAME PLACE.

LOOSE-PULLEY LUBRICATOR.

SPECIFICATION forming part of Letters Patent No. 487,257, dated December 6, 1892.

Application filed February 18, 1892. Serial No. 422,023. (No model.)

*To all whom it may concern:*

Be it known that I, EDWARD DAWSON, a citizen of the United States, residing at Terre Haute, in the county of Vigo and State of Indiana, have invented certain new and useful Improvements in Loose-Pulley Oilers; and I do hereby declare the following to be a full, clear, and exact description of the invention, such as will enable others skilled in the art to which it appertains to make and use the same.

This invention relates to oilers for loose pulleys; and it consists in the novel construction and combination of the parts hereinafter fully described and claimed.

In the drawings, Figure 1 is a longitudinal section through a pulley-hub provided with an oiler according to this invention. Fig. 2 is an end view of the pulley-hub. Fig. 3 is a cross-section through the pulley-hub, taken on the line $x\,x$ in Fig. 1. Fig. 4 is a detail end view of the hollow shaft or sleeve, showing the grooves in the collar. Fig. 5 is a longitudinal section through a pulley-hub and shows a modification of the invention.

A is the hub of the pulley, wheel, sheave, or trolley to which the oiler is applied. The hub A has a straight cylindrical hole $a$ bored through it.

B is the stationary shaft or sleeve upon which the pulley is to run. In Fig. 5 the shaft B is an ordinary long shaft, and may be either solid or tubular; but in Fig. 1 the shaft B is short and assumes the form of a sleeve.

In Fig. 1 C is an internal shaft or pin, and C' is a set-screw for securing the hollow shaft or sleeve B to the internal shaft. The set-screw C' engages with a screw-threaded hole in the collar $c$ and with a hole $c'$ in the hollow shaft B, so that when the set-screw is tightened up the shafts B and C are secured together and are practically the same as a long solid shaft, except that the short hollow shaft or sleeve may be removed and renewed as it becomes worn with less expense than renewing the entire shaft.

D is a collar secured on the shaft B. This collar may be formed integral with the shaft B, as shown in Fig. 1, or it may be secured to it by a set-screw $d$, as shown in Fig. 5, or it may be secured in any other approved manner.

The collar D is of the same diameter as the hole $a$ in the hub, and it is provided with cross-grooves 2 on its periphery and radial grooves 3 on its sides. When the collar D is integral with the shaft, it can be much narrower than when room is required for a fastening-screw.

In Fig. 5, $d'$ is a screw in the hub, for permitting access to the fastening-screw $d$.

E E are two similar bushes provided with inner flanges $e$ and outer flanges $e'$. These flanges fit the hole $a$ in the hub, and the bushes are secured to the hub by driving them into the hole tightly, or they may be secured by any approved fastening devices or screws.

Oil-chambers F are formed in the hole $a$, around the middle portions of the bushes E, between the flanges $e$ and $e'$. The inner flanges $e$ are provided with grooves 4 on their peripheries and the outer flanges are provided with holes 5. Annular chambers $f$ are formed in the outer faces of the flanges $e'$, and the holes 5 are inclined toward the chambers $f$ and connect them with the oil-chambers F. The chambers $f$ have lips $f'$, which prevent the oil from running out.

The operation of the device is as follows: Oil is poured into the chambers F by inserting the nose of an oil-can into the chambers $f$ at the ends of the hub, care being taken not to pour in more than sufficient to fill the bottom portions of the chambers F up to the level of the lips $f'$ when the pulley is at rest; but the oil may be poured in without stopping the pulley. The oil is formed into an annular cylinder inside the hole $a$ by centrifugal force when the pulley is revolved rapidly, and it passes into the grooves 4 on the inner flanges $e$ of the bushes. The oil flows into the cross-grooves 2 on the stationary collar D and slides down the radial grooves 3 onto the bearing portion of the shaft. When the pulley revolves very slowly, the oil only passes into the grooves 4 when they are under the shaft; but sufficient of it is caught by the said grooves and is lifted by them and wiped off into the grooves 2 and 3 of the collar. When the pulley is revolved very fast, a portion of the oil is driven back by centrifugal force at the inner ends of the bushes next to the collar; but this oil is scraped off by the grooves 3 and is at once carried back to the shaft. The oil which falls on the shaft from the grooves 4 lubricates the bearing-surfaces of the bushes next to the shaft and works out of the ends of the bushes into the annular chambers $f$. The oil passes from the chambers $f$ back into the chambers F through the inclined holes 5 and is assisted by centrifugal force when the pulley is revolving rapidly. The lips $f'$ prevent the oil from running out of the chambers $f$ and being wasted.

What I claim is—

1. The combination, with a stationary shaft provided with a collar having grooves in its sides, of a revoluble hub, a bush secured in the hub and provided with a flange having cross-grooves in its edge and arranged next to the said collar, a chamber for oil between the said bush and hub, and an annular chamber at its other end around the shaft and communicating with the said oil-chamber, substantially as set forth.

2. The combination, with a stationary shaft provided with a collar having grooves in its sides, of a revoluble hub and bushes secured in the hub on each side of the said collar and provided with inner flanges having grooves in their peripheries communicating with the said grooves in the collar and outer flanges provided with annular end chambers and inclined holes, chambers for oil being formed between the bushes and the hub and connected with the annular chambers by the said holes, substantially as set forth.

3. The combination, with a stationary shaft provided with a collar having grooves in its sides, of a revoluble hub and bushes provided with outer flanges having annular end chambers and inclined holes, chambers for oil being formed between the bushes and hub and communicating with the said grooves in the collar and with the said annular chambers, substantially as and for the purpose set forth.

4. The combination, with a central shaft, of a removable hollow shaft secured on the central shaft and provided with a collar having grooves in its sides, a revoluble hub, and bushes secured in the hub and running on the said hollow shaft and provided with annular chambers at their outer ends, chambers for oil being formed between the said bushes and the hub and communicating with the said annular chambers and with the said grooves in the stationary collar, substantially as and for the purpose set forth.

In testimony whereof I affix my signature in presence of two witnesses.

EDWARD DAWSON.

Witnesses:
ALEX. MONROE,
GEORGE BURT.